Oct. 30, 1962 S. R. TOMES 3,061,815

SIGNAL TRANSLATING SYSTEM

Filed June 19, 1957 2 Sheets-Sheet 1

INVENTOR.
SIDNEY R. TOMES

BY Morris Lebkin

ATTORNEY

Oct. 30, 1962 S. R. TOMES 3,061,815

SIGNAL TRANSLATING SYSTEM

Filed June 19, 1957 2 Sheets-Sheet 2

INVENTOR.
SIDNEY R. TOMES
BY Morris Rabkin
ATTORNEY

United States Patent Office 3,061,815
Patented Oct. 30, 1962

3,061,815
SIGNAL TRANSLATING SYSTEM

Sidney R. Tomes, Grosse Pointe, Mich., assignor to Radio Corporation of America, a corporation of Delaware
Filed June 19, 1957, Ser. No. 666,647
6 Claims. (Cl. 340—147)

This invention relates to a signal translating system, and more particularly to a system for transmitting information coming in on parallel paths into a single path.

This invention finds application where it is desired to totalize multiple pulse signal sources. Many machines in present commercial use find a need for counting at various control points. One possible application lies in the automatic control of carton filling machines where the feed rate is high and necessitates multiple feeding heads. Another application is in the counting of newspapers being assembled on several assembly machines.

It is an object of this invention to provide an improved signal translating system for translating information on parallel paths to a single path.

It is a further object of this invention to provide an improved system for translating a number of pulses on parallel paths to a sequence of pulses on a single path.

More particularly, it is an object of this invention to provide an improved system for translating pulses on several electrical paths onto one path so that the pulses may be counted by suitable means.

It is a further object of this invention to provide an improved counting circuit for counting on one counter the number of items appearing at different locations.

In accordance with one embodiment of this invention, each of a plurality of input paths is provided with a respective stage comprising a bistable storage unit which may be set by the application of an input pulse. A one-phase to polyphase converter, or phase shifter, is provided whose outputs are fed, respectively, to the reset connections of the storage units, so that each of the storage units is reset at a different time interval from that of resetting another. Each of the storage units, when reset, produces an output pulse. Suitable connections are made (such as a buffer circuit) for coupling the output of the storage units to a counter.

The above and other objects of this invention are more fully apparent from the following specification, when read in conjunction with the accompanying drawings in which.

Figure 1:
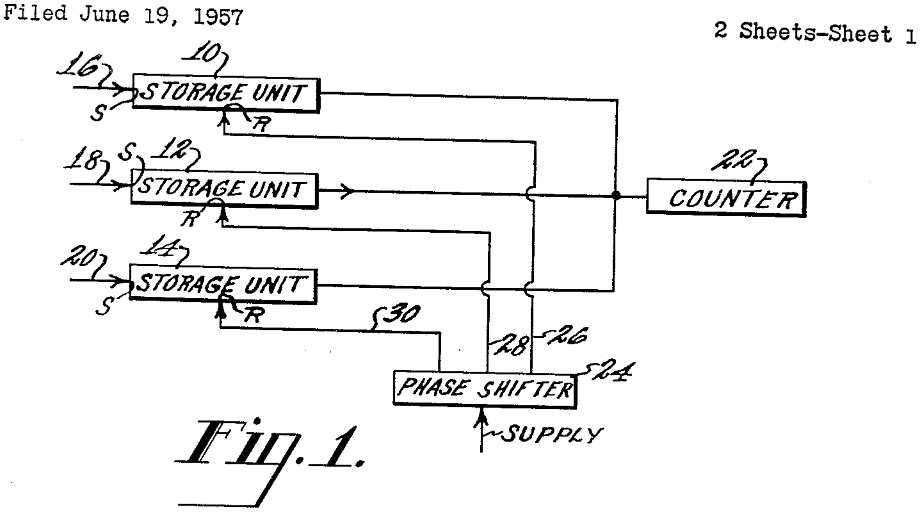
FIGURE 1 is a block diagram illustrating one embodiment of this invention.

With reference to FIGURE 1, there is illustrated a plurality of storage units 10, 12 and 14. Each of the storage units may be a bistable device and may be "set" by a signal input at input lines 16, 18, 20, respectively, connected respectively to "set" terminals S. Each of the storage units 10, 12, 14 has its output connected to a counter 22. A phase shifter 24 provides alternating current outputs of differing phase upon leads 26, 28 and 30 that are connected, respectively, to the reset terminals R of the storage units 10, 12, 14. The phase shifter 24 acts as a multiphase generator, and may be a single-phase to polyphase converter, such as a single-phase to three-phase converter.

In operation, pulses occur on the input lines 16, 18, 20 to "set" the respective storage units 10, 12, 14. The pulses on any one line may occur in random fashion. The phase shifter 24 provides a plurality of output voltages, each of a frequency $f$, but displaced in phase from one another. The phase shifter output voltage appearing on lines 26, 28 and 30 successively and sequentially "reset" the storage units 10, 12 and 14, respectively. The resetting of a storage unit causes a pulse to be "read out" to actuate the counter 22. If each of the storage units is, respectively, a bistable element, it is necessary, for accurate operation, that pulses appearing on any one of the input lines 16, 18, 20 should not occur at a repetition frequency greater than $f$. If, however, the storage unit is adapted to store more than one pulse at a time, such as a restriction is not necessary. With an input supply frequency to the phase shifter of 60 c.p.s., the pulse repetition duration may be as low as about 17 milliseconds.

Figure 2:
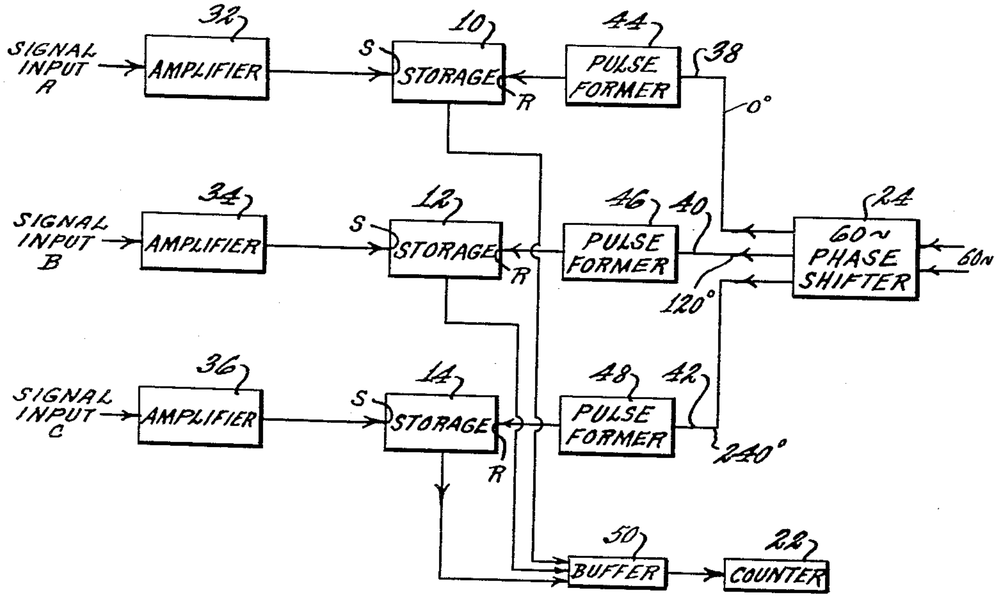
FIGURE 2 is a block diagram of another embodiment of this invention.

Referring to FIGURE 2, there is shown a similar system with additional features. A plurality of input signals, A, B and C, are applied to the set terminals S, respectively, of the amplifiers 32, 34, 36, whose outputs are connected to the "set" terminals S of the storage units 10, 12, 14. The phase shifter 24 illustrated in FIGURE 2 may have a voltage input whose frequency is 60 cycles per second (c.p.s.). Thus, the frequency of each of the outputs is 60 c.p.s. displaced from each other by 120°. Three outputs 38, 40, 42 are passed through pulse formers 44, 46, 48, respectively. Each pulse former 44, 46 or 48 changes a sinusoidal voltage to a voltage pulse. The outputs of the pulse formers 44, 46, 48 are connected respectively, to the "reset" terminals R of the storage units 10, 12 and 14. The outputs of the storage units 10, 12, 14 are fed to an or-gate, or buffer circuit 50, the output of which is connected to the counter 22.

In operation, each output voltage of the phase shifter differs in phase by $$\frac{360°}{n}$$

where $n$ is the number of storage units. For applications where the interval between counts on an individual signal source exceed $$\frac{1}{f}$$

second, the supply frequency at the phase shifter may be $f$ cycles per second. For example, where the interval between counts on an individual signal source exceeds 17 milliseconds, the phase shifter supply frequency may be 60 cycles per second. During operation, pulses are applied to the inputs of the amplifiers 32, 34, 36 to set the storage units 10, 12, 14. The pulses applied to the inputs of the amplifiers may occur randomly or periodically; they may occur simultaneously. However, the pulses on any one individual path occur at a lower repetition rate than the frequency of the input voltage applied to the phase shifter. The phase shifter 24 successively and sequentially applies a voltage to the reset terminals of the storage units 10, 12, 14, so that information which may have been stored in the storage units are read out in sequential order through the buffer circuit 50 to the counter 22.

Assume that input pulses occur at the input terminals of the storage units 10 and 14 simultaneously, and that no input pulse occurs at the input of the storage unit 12. Subsequently, a pulse from the pulse former 44 is applied to reset storage unit 10, thus reading out the signal stored in storage unit 10 to the counter 22. Next, a pulse is applied to the reset terminal of the storage unit 12, having no effect, due to a lack of stored information in the storage unit 12. Then, a pulse appearing at the reset terminal of storage unit 14 reads out the signal stored in the storage unit 14 to the counter 22. The next successive reset pulse is applied to storage unit 10. If, in the meantime, no other signal were stored therein, the reset pulse would have no effect upon the storage unit 10 or counter 22. If it be assumed that, by now, an input pulse has been stored in storage unit 12, the next successive pulse from the pulse former 46 reads out the stored pulse to the counter 22 through the buffer circuit 50. The buffer circuit 50 functions to prevent feedback to other stages.

Because every storage unit in the system has its reset pulses out of phase with one another, the overlapping of output signals from the storage units cannot occur. An input signal is sufficiently large to override a reset pulse, should they occur simultaneously.

Figure 3:
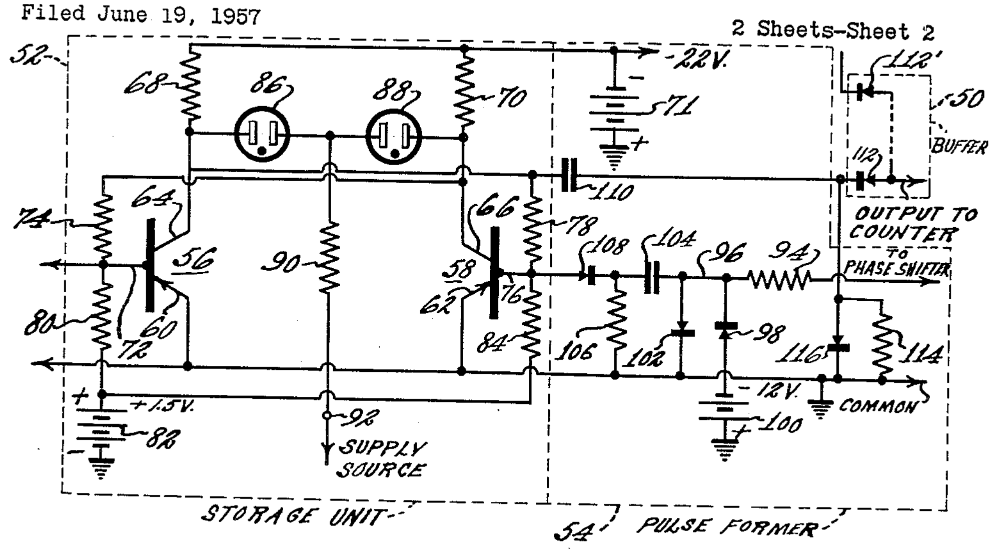
FIGURE 3 is a schematic of a transistor circuit showing one stage comprising a storage unit, a pulse former, and a buffer section.

Referring now to FIGURE 3, there is shown a transistor storage unit 52, which may be a flip-flop, and a pulse former 54. Transistors 56 and 58, illustrated in FIGURE 3 as being of N-type conductivity, form a flip-flop circuit. Transistors of P-type conductivity can be used, with obvious modifications. The emitters 60, 62 of the transistors 56, 58 are coupled to a point of reference potential, indicated as ground. Collectors 64, 66 of the transistors 56, 58 are connected respectively to resistors 68 and 70, at one terminal of each. The other terminals of the resistors 68, 70 are connected to the negative terminal of a supply voltage 71, the positive terminal of which is connected to ground. The base 72 of the left (as viewed in FIG. 3) transistor 56 is coupled by means of a resistor 74 to the collector 66 of the right transistor 58. The base 76 of the right transistor 58 is coupled by means of the resistor 78 to the collector 64 of the left transistor 56. A connection is made from the base 72 of the left transistor 56 by means of a resistor 80 to the positive terminal of a biasing voltage source 82. Likewise, the base 76 of the right transistor 58 is connected to the biasing voltage source 82 by means of a resistor 84. One terminal of a left neon tube 86 is coupled to the collector 64 of the left transistor 56. One terminal of a right neon tube 88 is coupled to the collector 66 of the right transistor 58. The other terminals of neon tubes 86 and 88 are coupled together, and connected through a resistor 90 to a voltage supply source 92. A negative input signal is applied to the base 72 of the left transistor 56.

A periodic voltage from the phase shifter 24 (not shown in FIG. 3) is connected to one terminal of a resistor 94 of the pulse former 54. The other terminal of the resistor 94 is connected to a junction 96. A diode 98 has its cathode connected to the junction 96, and has its anode connected to the negative terminal of a voltage source 100, the positive terminal of which is connected to ground. A diode 102 has its anode also connected to the junction 96 and its cathode connected to ground. Also, one terminal of a capacitor 104 is connected to the junction 96. The other terminal of the capacitor 104 is connected through a resistor 106 to the point of reference potential. The other terminal of the capacitor 104 is connected, also, to the cathode of a diode 108 whose anode is connected to the base 76 (the reset terminal R) of the right transistor 58 of the storage unit.

The output of the flip-flop 52, obtained from the left collector 64, is passed through a coupling capacitor 110 to the cathode of a diode 112 of the buffer circuit 50. The anode of the diode 112 is connected to the counter 22 (not shown). Also connected to the cathode of the diode 112 is one terminal of a resistor 114; the other terminal of which is connected to the point of reference potential. Shunted across the resistor 114, with its anode connected to the one terminal of the resistor 114 is a diode 116. The anode of the diode 112, connected to the counter 22, is connected to the anodes of other diodes 112' as indicated. The cathodes of the diodes 112' are connected to other storage units. The diodes 112 and 112' constitute the "or" gate or buffer 50.

In operation, assume that the flip-flop 52 is initially in its "reset" condition. The two neon lamps 86 and 88 indicate the bistable state of the flip-flop 52. The neon tubes are so arranged to give reliable operation without recourse to voltage operation for the tubes. The voltage supply source 92, which is rectified, is an oscillating 60 cycle per second voltage at about 140 volts peak.

With the flip-flop in the "reset" condition, the right transistor is conducting. The peak voltage applied to the right neon tube 88 is about 20 volts more than that applied to the left neon tube 86, causing the right neon tube 88 to strike. The left neon tube 86 is extinguished, due to the voltage drop across the resistor 90.

In the normal course of operaton, a negative "set" pulse is applied to the base 72 of the transistor 56 causing the left transistor 56 to conduct or be "on," and simultaneously causes the right transistor 58 to turn "off" or cease conduction. The flip-flop 52 is now in its "set" condition. Thus, with the left transistor 56 conducting, the left neon tube 86 strikes and the right neon tube 88 is extinguished. When the flip-flop 52 is "set," conduction through the left transistor 56 causes the voltage at the left conductor 64 to increase (i.e. become more positive). This increase in voltage passes through the capacitor 110 as a positive pulse, is blocked by the diode 112, and thus is dissipated, through the diode 116, to the point of reference potential, ground.

The flip-flop 52 is reset as follows: The sinusoidal voltage from the phase shifter 24, applied to the resistor 94, is distorted and differentiated by the pulse former 54. As shown, the voltage passed by the resistor 94, at junction 96, is limited between ground and −12 volts, due to the diodes 102 and 98. The sinusoidal voltage input therefore appears at the junction 96 as approximately a square wave. This square wave voltage is differentiated by the capacitor 104 and resistor 106, tending to produce a series of positive and negative pulses. However, due to the connection of the diode 108 between capacitor 104 and the base 76, of the right transistor 58, only negative pulses are permitted to pass through the diode 108 to the base 76. Thus, with the flip-flop 52 "set," a cycle of voltage applied to the input of the pulse former 54 causes a negative pulse to occur at the base 76 of the right transistor 58 to "reset" the flip-flop 52. When the flip-flop 52 is reset, the right transistor 58 conducts and the left transistor 56 does not conduct, so that the right neon tube 88 strikes and the left neon tube 86 is extinguished. The resetting of the flip-flop 52 causes conduction to cease through the left transistor 56, causing the voltage at the left collector 64 to decrease (i.e. become more negative). This decrease in voltage applied to the capacitor 110 causes a negative pulse to be passed through the buffer diode 112 to the counter 22.

The circuit specifications may vary according to the design for any particular application. The following circuit specifications are included by way of example for FIGURE 3:

The voltage supply source 71 is −22 volts. The voltage supply source 82 is +1.5 volts. The voltage supply source 100 is −12 volts. The voltage supply source 92 is a rectified, but pulsating 60 cycle per second voltage of about 140 volts peak.

Figure 4:
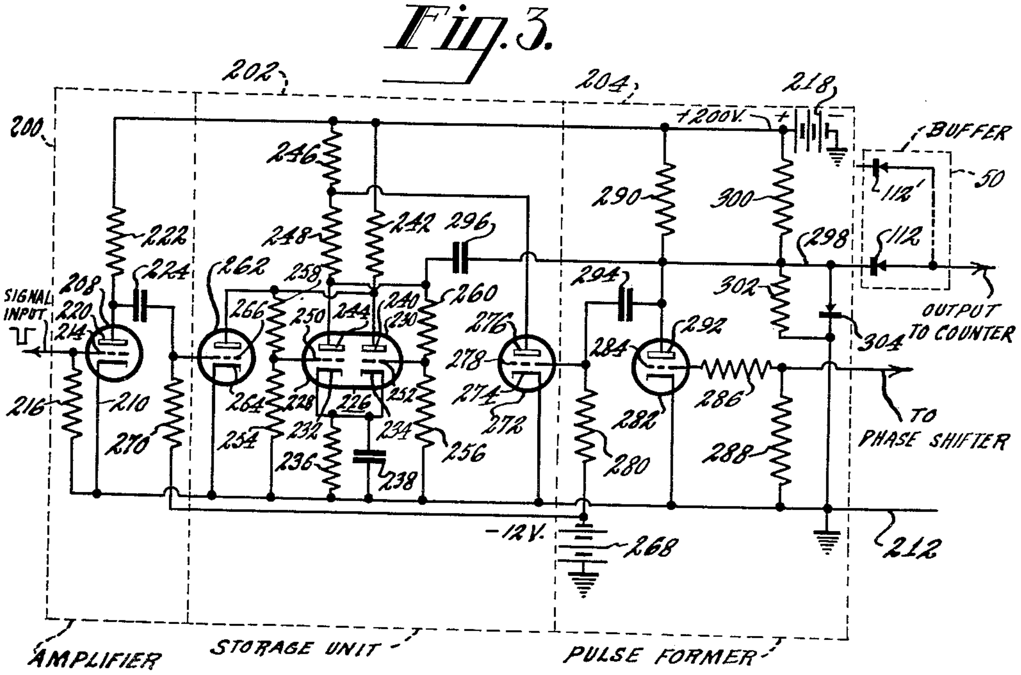
FIGURE 4 is a schematic of a vacuum tube circuit of one stage illustrating an amplifier storage unit, a pulse former, and a buffer section.

Referring to FIGURE 4, there is shown one stage for each input line comprising an amplifier 200, storage unit 202, a pulse former 204, and a section of a buffer 50.

The amplifier 200 comprises a vacuum tube triode 208 having its cathode 210 connected to a point of reference potential, 212, indicated as ground. The grid 214 of the triode 208 is coupled through a grid resistor 216 to ground. Voltage from a +200 volt supply source 218 is applied to the anode 220 of the triode 208 through a resistor 222. A positive, steady state voltage is applied to the grid 214 of the triode 208. A coupling capacitor 224 is connected to the plate 220 of the triode 208.

The storage unit 202 comprises a double triode tube 226 which includes a left triode 228 and a right triode 230. The cathodes 232, 234 of the double triode tube 226 are connected together and coupled to ground 212 through a resistor 236 and a capacitor 238 connected in parallel. The +200 volt supply voltage 218 is applied to the plate 240 of the right triode 230 through a resistor 242. The voltage from the supply source 218 is supplied to the anode 244 of the left triode 228 through a pair of serially connected resistors 246, 248. The grids 250 and 252 of the triodes 228, and 230 are connected to ground 212, respectively, through resistors 254 and 256. The grid 250 of left triode 228 and the anode 240 of the right triode 230 are cross coupled by means of a resistor 258. Likewise, the grid 252 of the right triode 230 and the anode 244 of the left triode 228 are coupled by means of a resistor 260. A "set" buffer tube such as a triode 262 has its cathode 264 connected to ground 212. The grid 266 of the "set" tube 262 is connected to the anode 220 of the left triode 208 through the coupling capacitor 224. The grid 266 is also coupled to a —12 volt bias source 268 through a resistor 270. A "reset" buffer tube 272 has its cathode 274 connected to ground 212. The anode 276 of the "reset" tube is connected to the junction of resistors 246, 248. The grid 278 of the "reset" tube 272 is connected to the biasing source 268 through a resistor 280.

The output of the storage unit 202 is obtained from the anode 244 of the left triode 228. A capacitor 296 connects the anode 244 to a junction point 298. The supply voltage 218 is applied to this junction point 298 through a resistor 300. A resistor 302 is connected between the junction point 298 and ground 212. A diode 304 has its anode connected to this junction point 298, and its cathode connected to ground. Another diode 306 has its cathode connected to the junction point 298 and has its anode coupled to the input terminal of the counter 22.

The pulse forming section 204 includes a triode 282 having its grid 284 connected by means of a resistor 286 to the output of the phase shifter 24. Plate voltage is applied to the triode 282 from the voltage supply source 218 through a resistor 290. An output is obtained from the anode 292 of the triode 282 by means of a capacitor 294 connected to the grid 278 of the "reset" tube 272.

The phase shifter, in one application, provides a 60 cycle, 100 volt sinusoidal input. A resistor 288 is connected between the phase shifter end of the resistor 286 and the point of reference potential 212.

The circuit specifications may vary according to the design for any particular application. The following circuit specifications are included by way of example for FIGURE 4:

| | | |
|---|---|---|
| Resistor **216** | | 47K |
| Battery **218** | volts | +200 |
| Resistor **222** | | 150K |
| Capacitor **224** | μμf | 3,300 |
| Resistor **236** | | 15K |
| Capacitor **238** | μf | .02 |
| Resistor **242** | | 47K |
| Resistor **246** | | 8.2K |
| Resistor **248** | | 39K |
| Resistor **254** | | 150K |
| Resistor **256** | | 150K |
| Resistor **258** | | 330K |
| Resistor **260** | | 330K |
| Battery **268** | volts | —12 |
| Resistor **270** | | 47K |
| Resistor **280** | | 47K |
| Resistor **286** | | 100K |
| Resistor **288** | | 47K |
| Resistor **290** | | 150K |

| | | |
|---|---|---|
| Capacitor **294** | μμf | 270 |
| Capacitor **296** | μμf | 270 |
| Resistor **300** | | 150K |
| Resistor **302** | | 150K |

All diodes are of the 1N34 type

Each of tubes 208, 282, 262, and 272 may be half of a twin triode type 6SN7 and tube 226 may also be a twin triode type 6SN7.

The circuit of FIGURE 4 operates as follows: Assume that triode 228 is conducting and that, therefore, the trigger tube 226 is in its "reset" condition. A negative signal input pulse is applied to the grid 214 of the amplifier 208, thereby producing a positive output pulse at the anode 220 of the amplifier 208. The "set" tube 262 is normally cut off. The pulse at the anode 220 of the amplifier 208 is applied to the grid 266 of the triode 262 through the coupling capacitor 224, producing a negative going voltage at the anode of the "set" triode 262. This negative going voltage lowers the potential at the anode 240 of the right triode 230 and the grid 250 of left triode 228, thereby placing the trigger tube 226 in its "set" condition. Thus, the right triode 230 is conducting, and the left triode 228 is cut off. An oscillating voltage is applied to the joint connection of resistors 288, 286 from the phase shifter. The voltage at the anode 292 of the triode tube 282 is approximately a square wave due to clamping action. The square wave is differentiated by the capacitor 294 and the resistor 280 so that, upon conduction of the tube 272, only negative pulses are produced at its anode 276. When a pulse occurs at the anode 276, the potential at the anode 244 of the left triode 228 is lowered, along with that of the grid 252 of the right triode 230, causing the trigger tube 226 to be "reset" due to regenerative action. The anode 276 of the "reset" tube 272 is connected to the load resistors 246, 248 at their joint connection; the anode of the "set" tube 262, connected to the anode of the right triode 230, is across the entire right triode load 242. The "tapping" of the "reset" signal to the joint connection of the left load resistors 246, 248 insures that when a signal pulse and a trigger pulse occur simultaneously, the signal pulse overrides the trigger pulse, "setting" the flip-flop.

Upon resetting, the potential at the anode 244 of left triode 228 drops in potential. The voltage drop is differentiated by the capacitor 296 and the resistor 302, and the resulting negative pulse produced is passed through the buffer diode 112. When the circuit is "set" and the anode 244 increases in potential, the increase is differentiated by the capacitor 296 and the resistor 302, causing a positive pulse. This positive pulse is blocked by the diode 112 and is dissipated to ground 212 through the diode 304. The function of the resistor 300 acts to remove spurious pulses which may occur at the triggering frequency.

The output of the diode 112 is connected, together with the output of other similar stages (such as from other diodes 112'), to operate the counter 22. By arranging each of these stages to be "reset" or triggered by an input having different phase displacements, the information or pulses stored in the flip-flops are read out at different time intervals. Therefore, the pulses are added together, regardless of whether the various stages are "set" simultaneously or not.

The phase shifter may be a single phase to polyphase converter, such as a single phase to three phase converter; it may be a polyphase power supply such as a two phase, three phase or four phase supply; it may be a single phase system coupled to suitably delay circuits for providing several outputs out-of-phase with one another.

Although there has been shown and described a system having three stages, any number of stages may be used as desired. By increasing the number of amplifiers, storage units, and pulse formers—and by increasing the number of phase displacement outputs from the phase shifter—the number of signal sources that can be accommodated can be correspondingly increased.

There has been shown and described a novel system for counting, on a single counter, the total number of pulses that occur at a plurality of stations. Such a system is highly effective, for instance, in counting the number of newspapers being produced on several presses so that the counter gives an accurate total.

What is claimed is:

1. Means for translating information appearing on a plurality, *n*, of input lines onto one output line comprising *n* storage units each having a pair of transistors of one conductivity type, said transistors each having a collector electrode, a base electrode, and an emitter electrode, each pair of transistors being coupled as a flip-flop, each of said storage units having a pair of neon tube indicators, one of a pair of said indicators being connected, respectively, to one of a pair of transistor collector electrodes, the other of a pair of indicators being coupled, respectively, to the other one of a pair of transistor collector electrodes, each one of a pair of neon tube indicators being coupled, respectively, to each other, said storage units each having an input and an output, said inputs being connected respectively to said input lines and said outputs being connected to said one output line, a phase shifter having *n* output terminals, said phase shifter producing voltage pulses in successive order on said output terminals, and means for connecting said output terminals of said phase shifter respectively to said storage units, said storage units being responsive, each to an output pulse on its associated phase shifter output terminal to read out its stored information onto said output line.

2. A system for counting pulses comprising, in combination, a plurality of two state storage circuits normally in a first of said states, each having an input terminal to which a pulse to be stored may be applied for switching said storage circuit to the second of its states, and an output terminal at which the switching of the storage circuit from the second back to the first of its states may be sensed; a like plurality of input circuits to each of which pulses to be counted may be applied, one connected to each input terminal; means coupled to all of said storage circuits for actuating them in time sequence for switching those circuits which have been placed in the second state back to the first state at a rate such that each storage circuit is actuated in a time less than that between adjacent input pulses to that storage circuit; and a circuit common to all output terminals for counting the switching from the second to the first state of said storage circuits and thereby indirectly counting the total number of pulses applied to all storage circuits.

3. A circuit for totaling together pulses appearing in different groups comprising, in combination, a plurality of storage circuits normally in a reset condition, each having an input terminal to which a pulse to be stored may be applied for setting said storage circuit, and an output terminal at which the resetting of the storage circuit may be sensed; means for applying a different group of time-sequential, asynchronously occurring pulses to be counted to each input terminal; means coupled to said storage circuits for resetting them in regular time sequence at a rate such that each set storage circuit is reset in a time less than that between adjacent input pulses to that storage circuit; and a circuit common to all output terminals for counting the resetting of the said storage circuits and thereby indirectly counting the total number of pulses applied to all storage circuits.

4. In the combination as set forth in claim 3, said means for applying asynchronously occurring pulses providing pulses of sufficient amplitude to override the resetting of a storage circuit if the pulse and reset operation occur concurrently.

5. A pulse counting system comprising, in combination, a plurality of normally reset, two state storage circuits, each having a set input terminal to which a pulse to be stored may be applied for setting said circuit, and an output terminal at which the resetting of the storage circuit may be sensed; a like plurality of input circuits to each set of which pulses to be counted may be applied, one connected to each set input terminal; means coupled to said storage circuits for resetting them in time sequence at a rate such that each set circuit is reset in a time less than that between adjacent input pulses to that storage circuit; a circuit common to all output terminals for counting the resetting of said storage circuits and thereby indirectly counting the total number of pulses applied to all storage circuits; and visual indicating means coupled to each storage circuit for indicating whether said circuit is set or reset.

6. An event counting system comprising, in combination, a plurality of storage circuits normally in a first state, each having a first input terminal to which separate signals indicative of events which may occur randomly may be applied for storage in said storage circuit as a change in state of said storage circuit, each also having a second input terminal to which a signal for interrogating the storage circuit may be applied for effecting a change in state of said storage circuit only if said circuit is storing a signal indicative of an event, and each also including an output terminal separate from the second terminal from which a signal stored in said circuit may be read out when said circuit is interrogated; a like plurality of input circuits to each of which separate trains of signals may be applied, one connected to each first input terminal; means coupled to said second input terminal of said storage circuits for electrically interrogating said circuits in time sequence and at a rate such that each storage circuit is interrogated in a time less than that between adjacent input signals to that storage circuit; and a circuit common to all output terminals for counting the total number of signals sensed at said output terminals.

References Cited in the file of this patent

UNITED STATES PATENTS

| | | |
|---|---|---|
| 1,918,252 | Dunham | July 18, 1933 |
| 2,146,862 | Shumard | Feb. 14, 1939 |
| 2,454,792 | Grieg | Nov. 30, 1948 |
| 2,533,001 | Eberhard | Dec. 5, 1950 |
| 2,534,544 | Bush | Dec. 19, 1950 |
| 2,570,716 | Rochester | Oct. 9, 1951 |
| 2,605,306 | Eberhard | July 29, 1952 |
| 2,634,052 | Bloch | Apr. 7, 1953 |
| 2,641,641 | Edgar | June 9, 1953 |
| 2,719,959 | Hobbs | Oct. 4, 1955 |
| 2,755,338 | Richmond | July 17, 1956 |
| 2,848,647 | Kuchinsky et al. | Aug. 19, 1958 |
| 2,937,369 | Newbold et al. | May 17, 1960 |
| 2,978,174 | Dean | Apr. 4, 1961 |

FOREIGN PATENTS

| | | |
|---|---|---|
| 128,537 | Australia | July 28, 1948 |
| 128,538 | Australia | July 28, 1948 |

OTHER REFERENCES

Electronics, June 1944, pp. 110–113 and pp. 358 and 360.

Electronics, December 1955, pp. 135–137.

UNITED STATES PATENT OFFICE
CERTIFICATE OF CORRECTION

Patent No. 3,061,815 October 30, 1962

Sidney R. Tomes

It is hereby certified that error appears in the above numbered patent requiring correction and that the said Letters Patent should read as corrected below.

Column 8, line 11, strike out "set".

Signed and sealed this 2nd day of July 1963.

(SEAL)
Attest:

ERNEST W. SWIDER
Attesting Officer

DAVID L. LADD
Commissioner of Patents